Patented Apr. 27, 1954

2,676,963

UNITED STATES PATENT OFFICE 2,676,963

METHOD OF PURIFYING CYANURIC CHLORIDE

Bernard W. Rottschaefer, East Greenbush, and Harold Simon, Albany, N. Y., assignors to General Aniline & Film Corporation, New York, N. Y., a corporation of Delaware No Drawing. Application September 7, 1951, Serial No. 245,634

8 Claims. (Cl. 260—248)

This invention relates to a method of purifying cyanuric chloride, particularly cyanuric chloride produced by the polymerization of cyanogen chloride.

Cyanuric chloride has been found to be a valuable intermediate in the manufacture of many products, as for example chemotherapeutic agents, insecticides, dyes, brightening agents, synthetic resins, plastics, rubber, explosives, and other materials. For many of these uses, particularly in the manufacture of brightening agents, it is highly desirable that the cyanuric chloride employed be of a relatively high degree of purity. However, the most important method of producing cyanuric chloride is by halide-catalyzed polymerization of cyanogen chloride, and the cyanuric chloride thus produced is known to contain a great many impurities. These impurities are generally believed to be linear polymers of cyanogen chloride.

An object of this invention is to provide a method of purifying crude cyanuric chloride by removing the impurities usually present therein. Other objects and advantages will appear as the description proceeds.

The accomplishment of these objects is made possible by the instant invention, which involves solution of the impure cyanuric chloride in an inert organic liquid, treatment of the solution with an aluminum halide, and removal of the separated impurities. The resulting solution of pure cyanuric chloride may be used as such or the pure cyanuric chloride may be isolated therefrom as by evaporation to dryness or the like.

Any inert organic solvent for the cyanuric chloride may be employed, such as chlorinated hydrocarbons, e. g., carbon tetrachloride, chloroform, ethylene dichloride, trichlorethylene, chlorobenzene, and the like; aliphatic ethers, such as ethyl ether, n-butyl ether, isopropyl ether, dioxane, butyl Cellosolve (ethylene glycol monobutyl ether), diethyl Cellosolve (ethylene glycol monobutyl ether), and the like; hydrocarbons, such as benzene, heptane, and the like; certain ketones, nitriles, and nitrated aromatic compounds; and other inert organic solvents for the cyanuric chloride.

The temperature at which the treatment is carried out may be from about 10 to 90° C., but the preferred range is from about 50 to 60° C. The duration of the treatment depends, of course, upon the amount and type of impurities present, the temperature, etc. Usually about two hours is a sufficient time, but if the treatment is carried out at a low temperature, or a high percentage of impurities is present, a longer treatment may be necessary.

During the treatment in accordance with the present invention, the impurities separate out as tars, resins, and the like, apparently as a result of the further polymerization of the aforementioned linear polymer impurities. To assist in the separation, a commercial absorbent may be added in order to absorb the tars and resins formed. Such suitable absorbents may be Filter-Cel (a commercial absorbent silica), charcoal, fuller's earth, absorbent clays, and other well-known absorbents and/or filter aids. The preferred aluminum halide is aluminum chloride, but aluminum bromide may also be used.

The following example is illustrative of the invention and is not to be regarded as limitative:

Example 18.5 parts cyanuric chloride are slurried with 245 parts carbon tetrachloride, 7 parts Filter-Cel and 7 parts anhyd. $AlCl_3$. The charge is heated for about 2 hours at 50–60° C. and then filtered. The filtrate is concentrated on a hot bath and then cooled, yielding a white, crystalline cyanuric chloride that has a very high degree of purity.

Various modifications and variations of this invention will be obvious to a person skilled in the art, and such variations and modifications are to be regarded as within the purview of this application and the spirit and scope of the appended claims.

We claim:

1. A method of purifying crude cyanuric chloride consisting essentially in dissolving the crude cyanuric chloride in an inert organic solvent for the cyanuric chloride and treating the resulting solution with an aluminum halide and a solid absorbent selected from the group consisting of charcoal, absorbent silicas and absorbent clays.

2. The process of claim 1 in which the aluminum halide is aluminum chloride.

3. The process of claim 2 in which the solvent is carbon tetrachloride.

4. The process of claim 1 in which the solid absorbent is an absorbent silica.

5. A process of purifying crude cyanuric chloride consisting essentially in dissolving the crude cyanuric chloride in an inert organic solvent for the cyanuric chloride, treating the resulting solution with aluminum chloride and a solid absorbent selected from the group consisting of charcoal, absorbent silicas and absorbent clays at about 10 to 90° C. until the impurities separate, and then removing the separated impurities.

6. The method of claim 5 in which the solid absorbent is an absorbent silica.

7. A process of purifying crude cyanuric chloride consisting essentially in dissolving the crude cyanuric chloride in carbon tetrachloride, treating the solution with aluminum chloride and a solid absorbent selected from the group consisting of charcoal, absorbent silicas and absorbent clays for about two hours at about 50 to 60° C., filtering off the separated impurities and isolating the substantially pure cyanuric chloride from the filtrate.

8. A method of purifying crude cyanuric chloride consisting essentially in treating with an aluminum halide and a solid absorbent selected from the group consisting of charcoal, absorbent silicas and absorbent clays, a solution of the crude cyanuric chloride in an inert organic solvent for the cyanuric chloride until the impurities separate, and then removing the separated impurities.

References Cited in the file of this patent

UNITED STATES PATENTS

| Number | Name | Date |
| --- | --- | --- |
| 1,566,742 | Fritzsche | Dec. 22, 1925 |
| 2,232,871 | Schmidt | Feb. 25, 1941 |
| 2,414,655 | Metcalfe | Jan. 21, 1947 |
| 2,416,656 | Thurston | Feb. 25, 1947 |
| 2,417,659 | Oldham | Mar. 18, 1947 |
| 2,541,053 | Hartigan | Feb. 13, 1951 |

FOREIGN PATENTS

| Number | Country | Date |
| --- | --- | --- |
| 339,464 | Canada | 1941 |

OTHER REFERENCES

Migrdichian, 544 O. G. 458 and 459.